United States Patent
Propp

(10) Patent No.: US 8,713,933 B2
(45) Date of Patent: May 6, 2014

(54) APPARATUS AND PROCESS FOR RECOVERING ENERGY FROM BOUYANCY AND GRAVITATIONAL FORCES

(75) Inventor: David M. Propp, Ponte Vedra Beach, FL (US)

(73) Assignee: Buoyant Energy, LLC, Jacksonville, FL (US)

( * ) Notice: Subject to any disclaimer, the term of this patent is extended or adjusted under 35 U.S.C. 154(b) by 1031 days.

(21) Appl. No.: 12/590,774

(22) Filed: Nov. 13, 2009

(65) Prior Publication Data

US 2010/0115940 A1    May 13, 2010

Related U.S. Application Data

(63) Continuation-in-part of application No. 12/455,360, filed on Jun. 1, 2009, now abandoned.

(60) Provisional application No. 61/130,439, filed on May 3, 2008.

(51) Int. Cl.
  *F03C 1/00*        (2006.01)
(52) U.S. Cl.
  USPC ............................................. 60/496; 60/495
(58) Field of Classification Search
  USPC .......................... 60/398, 495–498; 290/42, 53
  See application file for complete search history.

(56) References Cited

U.S. PATENT DOCUMENTS

| | | |
|---|---|---|
| 272,656 A | 2/1883 | Cook |
| 3,934,964 A * | 1/1976 | Diamond ........................ 415/7 |
| 3,961,479 A | 6/1976 | Anderson |
| 4,038,826 A | 8/1977 | Shaw |
| 4,207,741 A | 6/1980 | Rainey |
| 4,498,294 A * | 2/1985 | Everett ............................ 60/496 |
| 4,674,281 A | 6/1987 | Kim et al. |
| 4,683,720 A | 8/1987 | De Shon |
| 4,726,188 A | 2/1988 | Woolfolk |
| 4,845,376 A | 7/1989 | Bendiks |
| 4,883,411 A | 11/1989 | Windle |
| 6,018,947 A | 2/2000 | DeMarco et al. |
| 6,457,307 B1 * | 10/2002 | Feldman et al. ................ 60/398 |
| 6,945,042 B1 | 9/2005 | Walckner |
| 6,964,165 B2 | 11/2005 | Uhl et al. |
| 7,781,903 B2 * | 8/2010 | Buffard et al. .................. 290/42 |

* cited by examiner

*Primary Examiner* — Hoang Nguyen
(74) *Attorney, Agent, or Firm* — Stephen E. Kelly; Rogers Towers, P.A.

(57) ABSTRACT

An apparatus and process for capturing mechanical work from the kinetic energy of a moving vessel driven by buoyancy and gravitational forces. The apparatus comprises a moving vessel, gas compression means, force transfer means, a conduit, and a force recovery means. In use, the submerged moving vessel receives compressed gas, generating a buoyancy force in the moving vessel. As the moving vessel rises in water and approaches the top of its upstroke, the moving vessel releases the gas, causing the moving vessel to sink. A first component of the buoyancy force is transmitted from the moving vessel, through the force transfer means, to the gas compression means, where it compresses gas. The compressed gas is channeled through the conduit into the charging valve while the moving vessel sinks. The charging valve releases the compressed gas from the conduit into the moving vessel, and the moving vessel's vertical oscillation cycle repeats.

20 Claims, 7 Drawing Sheets

APPARATUS AND PROCESS FOR RECOVERING ENERGY FROM BOUYANCY AND GRAVITATIONAL FORCES

This application is a continuation-in-part of U.S. Non-Provisional patent application Ser. No. 12/455,360, filed on Jun. 1, 2009 now abandoned, which claims the benefit of U.S. Provisional Patent Application Ser. No. 61/130,439, filed on May 30, 2008. The written disclosures of these two prior applications are incorporated herein by this reference.

BACKGROUND OF THE INVENTION

In the past decade, there has been increasing public awareness about environmentally friendly energy sources, sometimes called "alternate" energy sources. Most alternate energy sources suffer from poor efficiency and are unable to deliver power in the quantity or for the duration that would serve as a viable alternate to traditional energy sources, such as fossil fuels. Other alternate energy sources, such as solar panels or windmills, depend on certain environmental conditions for their processes to function properly. Other alternate energy sources depend on external pumps, compressors, or fuel sources to sustain the system. Such systems demand a high level of maintenance and may not be conducive to being transported to remote locations.

One known alternative energy system involves the buoyancy force of air rising through a liquid as a source of energy. The buoyancy force can be used to drive conventional energy conversion means, such as pumps or turbines. Examples of such systems are shown in U.S. Pat. No. 6,018,947 to DeMarco et al. and U.S. Pat. No. 6,964,165 to Uhl et al., both of which teach systems that are capable of recovering energy from the buoyancy forces generated by injecting a compressed gas into a submerged containment vessel capable of moving in water. However, these systems depend on an external gas compressor to provide an amount of gas sufficient to drive the system and generate the buoyancy force, as taught therein.

The present invention seeks to overcome these problems by delivering a system and process for recovering energy from buoyancy and gravitational forces while reducing, or even eliminating, the need for an external source of compressed gas.

SUMMARY OF THE INVENTION

The present apparatus and process are capable of delivering useable power or mechanical work by generating and using a buoyancy force to drive a means for converting energy, such as a flywheel, turbine or pump. The main driving forces in the apparatus are the buoyancy and gravitational forces of a submerged moving vessel. Specifically, the apparatus is capable of bifurcating the buoyancy force into a first component that is used to compress the gas necessary to sustain the vertical oscillation cycle of the moving vessel, and a second component that drives a turbine, pump, or other means for converting energy.

The apparatus generally comprises a moving vessel, a gas compression means, a force transfer means, a conduit, and a force recovery means. The moving vessel is capable of sinking in water, and it comprises a gas control means and one or more cavities capable of receiving, retaining, and releasing compressed gas. The gas control means is a means for controlling the cavity's retention and release of gas, and the gas control means could be a valve, a release plate, a release hatch, or the like.

The gas compression means is a means for using a force to compress a gas to a predetermined, minimum pressure level. Such gas compression means could be a bellows, a piston, a rotary screw compressor, or the like. The force transfer means is a means for transferring a first component of the buoyancy force from the moving vessel to the gas compression means for use as the required compressive force. The conduit is any hose, pipe, duct, or the like capable of sealably connecting to the gas compression means and channeling compressed gas from the gas compression means to a location at or near the bottom of the moving vessel's down stroke. At the end of the conduit opposite that of the gas compression means, the conduit comprises a charging valve capable of retaining the compressed gas until the moving vessel is at or near the bottom of its down stroke. The charging valve is further capable of releasing the compressed gas into the cavity of the moving vessel at a predetermined time or upon the occurrence of a predetermined set of conditions. The force recovery means is any means for capturing a second component of the moving vessel's buoyancy force, and transferring this second component to a conventional energy conversion device, such as a turbine, flywheel, pump, or the like.

In an example of a generalized embodiment of how the system operates, the moving vessel begins submerged in water at the bottom of its down stroke and receives an initial prime via an external air compressor, or any such acceptable means for introducing compressed gas into the moving vessel. Upon receiving the compressed gas into its cavity, the moving vessel's buoyancy force becomes greater than the magnitude of its downward gravitational force, and the moving vessel begins to rise through the water. As the moving vessel reaches the top of its upstroke, the gas control means releases the gas from the cavity of the moving vessel, allowing water to enter into the cavity. As the water enters the cavity, the magnitude of the moving vessel's upward buoyancy force falls below the magnitude of the downward gravitational force, and the moving vessel begins to sink.

During the moving vessel's upstroke, the buoyancy force of the moving vessel is bifurcated into two components. A first component of the buoyancy force is transmitted from the moving vessel, through the force transfer means, to the gas compression means, where it is used to compress the gas. The compressed gas then exits the gas compression means and is channeled into and through the conduit where it is retained by the charging valve while the moving vessel sinks in the water. When the moving vessel approaches or reaches the bottom of its down stroke, the charging valve releases the compressed gas from the conduit into the cavity of the moving vessel, and the moving vessel's vertical oscillation cycle begins to repeat. A second component of the buoyancy force is recovered by a force recovery means, which is any means for recovering the second component of the buoyancy force and transferring it to an energy conversion means, where it is converted into usable energy. Thus, the vertical oscillation of the moving vessel produces useable energy.

DETAILED DESCRIPTION OF THE INVENTION

With reference to the drawings, the invention will now be described with regard for the best mode and the preferred embodiment. In general, the invention is an apparatus and a process of producing mechanical work and useable energy by recovering and converting buoyancy and gravitational forces into a more convenient energy form. The embodiments disclosed herein are meant for illustration and not limitation of the invention. An ordinary practitioner will understand that it is possible to create many variations of the following embodiments without undue experimentation.

The critical driving component of the apparatus and process is the buoyancy force generated when a submerged moving vessel receives and retains gas into an inner cavity. The gas could be any gas, and in most applications the gas will be atmospheric air. The apparatus is capable of bifurcating the buoyancy force into two components, the first component 11 being used to compress additional gas to sustain the cyclical nature of the process, and the second component 12 of the buoyancy force being converted into a more useable energy form, such as electricity or compressed gas.

Figure 1:
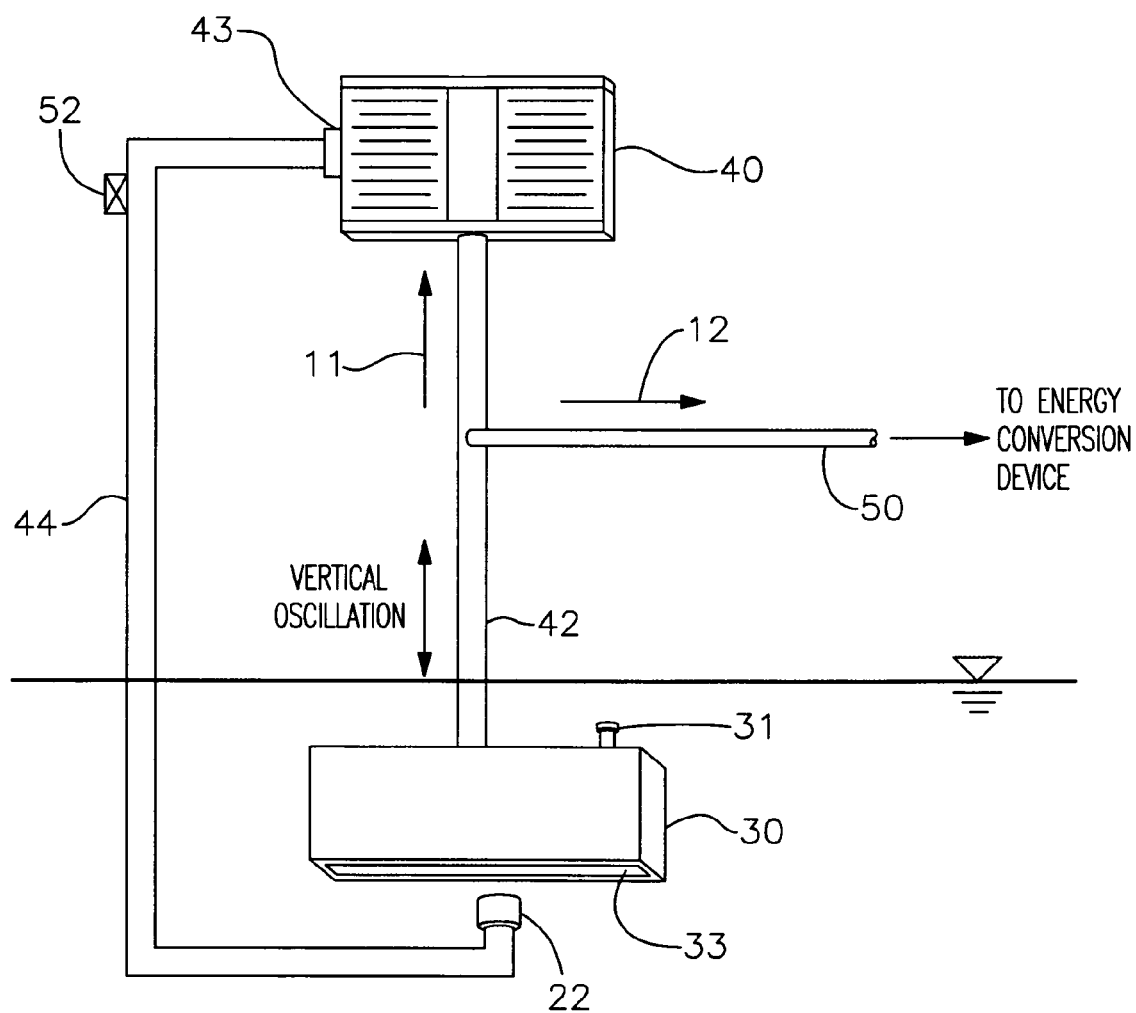
FIG. 1 is an elevation view of the basic embodiment of the apparatus.

Referring to FIG. 1, the apparatus generally comprises a moving vessel 30, a gas compression means 40, a force transfer means 42, a conduit 44, and an force recovery means 50. For proper operation of the apparatus and method, the moving vessel 30 must be capable of sinking in water. In most embodiments, the moving vessel 30 is capable of sinking in water under the gravitational force of its own weight. In some embodiments the addition of weights may be required to increase the magnitude of gravitational force such that the moving vessel 30 will sink in a timely manner.

The moving vessel 30 comprises an opening 33 to receive compressed gas, one or more cavities 32 (shown in FIG. 4), and a gas control means 31. The opening 33 is located near the bottom of the moving vessel 30, and the opening 33 is sized and oriented such that compressed gas can be released from the charging valve 22, through the opening 33, and into the cavity 32. The cavity 32 is capable of receiving a predetermined volume of gas and retaining it inside the moving vessel 30 until the gas is released from the cavity via the gas control means 31. The gas control means 31 is a means for controlling the cavity's 32 retention and release of gas, and the gas control means 31 could be one or more valves, a release plate, a hatch, or the like. The gas control means 31 must be capable of sealing the cavity 32 at the desired times so that the gas in the cavity 32 can create the buoyancy force. The gas control means 31 must also be capable of releasing the gas from the cavity 32 when the moving vessel is at or near the top of its upstroke, thus permitting water to enter into the cavity 32 to reduce or eliminate the buoyancy force.

The gas compression means 40 is a means for using a force to compress a gas to a predetermined, minimum pressure level. Such gas compression means could be a bellows, a piston, a rotary screw compressor, or the like. The force transfer means 42 is any means for transferring to the gas compression means 40 at least a portion of the moving vessel's 30 buoyancy force. The force transfer means 42 could be a cable, bar, frame, plate, bracket, slide, clamp, or the like. In most instances a suitable force transfer means 42 will be determined from the overall configuration of the apparatus. The conduit 44 is any hose, pipe, duct, or the like capable of channeling compressed gas from the gas compression means 40 to a location at or near the bottom of the moving vessel's 30 down stroke. The conduit 44 is sealably connected to the gas compression means 40. At the interface between the gas compression means 40 and the conduit 44 there is a one-way exit valve 43, which allows gas to exit the gas compression means 40 into the conduit 44, but prevents gas in the conduit 44 from entering the gas compression means 40. At the end of the conduit 44 opposite that of the gas compression means 40, the conduit 44 comprises a charging valve 22 capable of retaining the compressed gas until the moving vessel 30 is at or near the bottom of its down stroke.

Then force recovery means 50 is a means for recovering and transferring the second component 12 of the moving vessel's 30 buoyancy force to an energy recovery means. The energy recovery means is any means for converting a force into a useable energy form, such as a flywheel, pump, turbine, or a similar device. For example, the force recovery means 50 could be a lever attached to the force transfer means 42, as shown in FIG. 1. The lever 50 transfers the second component 12 to a flywheel, a pump or a turbine, thereby recovering a portion of the energy generated by the moving vessel's buoyancy force.

In an example of a generalized embodiment of how the system operates, the moving vessel 30 begins submerged in water at the bottom of its down stroke, and the system receives an initial prime, which can be administered by many methods. For example, an external gas compressor can be used to create the initial prime by introducing compressed gas through a priming valve 52 and into the conduit 44, and the compressed gas in the conduit 44 then remains pressurized between the charging valve 22 and the exit valve 43. After the initial prime of compressed gas at the beginning of the cycle, the system can run without external energy sources until the internal losses of the system debilitate its performance to an unsatisfactory level.

To begin the moving vessel's 30 vertical oscillation cycle, the charging valve 22 releases the initial prime of compressed gas into the cavity 32 of the moving vessel 30. Upon receiving the gas into its cavity 32 or cavities, the moving vessel's 30 upward buoyancy force becomes greater than the magnitude of its downward gravitational force, and the moving vessel 30 begins to rise through the water. As the moving vessel 30 reaches the top of its upstroke, the gas control means 31 releases the gas from the cavity 32 of the moving vessel 30, allowing water to enter into the cavity 32. As the water enters the cavity 32, the magnitude of the moving vessel's 30 upward buoyancy force falls below the magnitude of its downward gravitational force, and the moving vessel 30 begins to sink.

During the moving vessel's 30 upstroke, the force transfer means 42 and force recovery means 50 bifurcate the buoyancy force into two components. The first component 11 of the buoyancy force is transmitted from the moving vessel 30, through the force transfer means 42, to the gas compression means 40, where it is used to compress gas. The compressed gas exits the gas compression means 40 and is channeled into and through the conduit 44 where it is retained by the charging valve 22 while the moving vessel 30 sinks in the water. When the moving vessel 30 approaches or reaches the bottom of its down stroke, the charging valve 22 releases the compressed gas from the conduit 44 into the cavity 32 of the moving vessel 30, and the moving vessel's 30 vertical oscillation cycle begins to repeat. During each upstroke of the cycle, the force recovery means 50 recovers the second component 12 of the buoyancy force, which is used to drive the force recovery means 50.

In one embodiment of the apparatus, the gas compression means 40 comprises one or more bellows 140 (shown in FIGS. 2 & 3), many types of which are commercially available. The charging valve 22 is any valve that remains closed until it is engaged by the moving vessel 30 or otherwise opened to release the compressed gas into the moving vessel 30. In many applications, the bellows 140 is positioned above the moving vessel 30, but it can be placed at any location permitting the motion of the moving vessel 30 to compress the gas inside the bellows 140. The bellows 140 should be made of a material of sufficient strength and durability to withstand the forces developed during the gas compression process, as well as the fatigue stresses of several thousand compression cycles. Such materials include most metals and many types of plastics or carbon-fiber material.

The force transfer means 42 must have sufficient strength and stability to withstand the compression forces that it transmits during the movement cycle. The length and configuration of the force transfer means 42 and the height of the bellows 140 should be proportioned such that the bellows 140 is fully compressed when the moving vessel 30 is near the top of its upstroke, and the bellows 140 should be fully open when the moving vessel 30 engages the charging valve 22 at the bottom of the moving vessel's 30 down stroke. As the moving vessel 30 moves cyclically up and down, the second component 12 of the buoyancy force is recovered by the force recovery means 50 and transferred to an energy conversion means, thus converting the kinetic and potential energy of the moving vessel 30 into usable.

As an alternate method for priming the bellows-type embodiment, the moving vessel 30 is initially positioned near the top of its upstroke with the cavity 32 substantially full of water. In this embodiment, before the moving vessel 30 is set into motion the gas in the conduit 44 must be initially primed, as described above. The moving vessel 30 is then released, permitting gravity to pull the moving vessel 30 downward through the water. As the moving vessel 30 drops, the force transfer means 42 pulls the bellows 140 open, thereby drawing gas into the bellows 140. The moving vessel 30 continues to drop until it engages the charging valve 22, which releases the initial prime of compressed gas into the cavity 32, thereby forcing the water out of the cavity 32. As the gas enters the cavity 32, the magnitude of the main vessel's 30 upward buoyancy force grows until it becomes greater than that of the downward gravitational force. Under this condition, the moving vessel 30 moves upward through the water, thus causing the force transfer means 42 to compress the bellows 140, which pressurizes the gas that entered when the moving vessel 30 initially dropped. The compressed gas exits the bellows 140 and moves into the conduit 44 where it is retained by the charging valve 22.

When the moving vessel 30 reaches the top of its upstroke, the gas from within the cavity 32 is released via the gas control means 31, causing the cavity 32 to refill with water and reduce the magnitude of the moving vessel's 10 upward buoyancy force below that of the gravitational force. Under this condition, the moving vessel 30 sinks down towards the charging valve 22, thereby repeating the process.

The cycle can be stopped by releasing or opening the priming valve 52 in the conduit 44, thereby removing the compressed gas from the system and eliminating the buoyancy force of the moving vessel 30. The apparatus will require periodic service and maintenance as required by the particular application and environmental conditions. More frequent service and maintenance may be required where the system operates in harsh environmental conditions, such as in a desert or in a corrosive saltwater environment.

As a specific example of a bellows-type embodiment, the bellows 140 comprises four separate bellows units, each having a stroke length of about 52½ inches. Together, the bellows 140 require 117.6 pounds of total force to compress a volume of 7.3 cubic feet of air into a volume of 5.9 cubic feet of compressed gas at a pressure of 3.5 pounds per square inch. When this volume of compressed gas is introduced into the moving vessel at a depth of 7 feet, the resulting buoyancy force is 412 pounds near the bottom of the down stroke and 455.8 pounds near the top of the upstroke. Thus, the total buoyancy force is greater than the first component 11 of buoyancy force needed to compress the bellows 140, and the capturable second component 12 of the buoyancy force exceeds 250 pounds in each cycle of the vertical oscillation.

Figure 2:
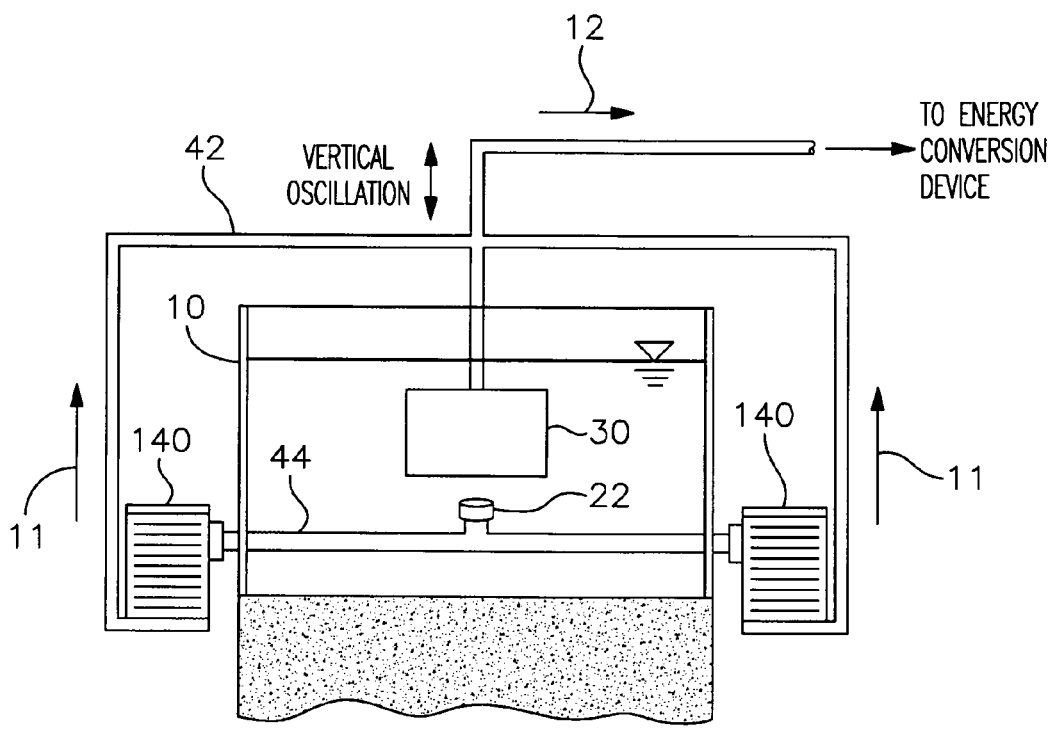
FIG. 2 is an elevation view of an alternate embodiment of a gas compression means where the moving vessel is contained inside a water tank.
Figure 3:
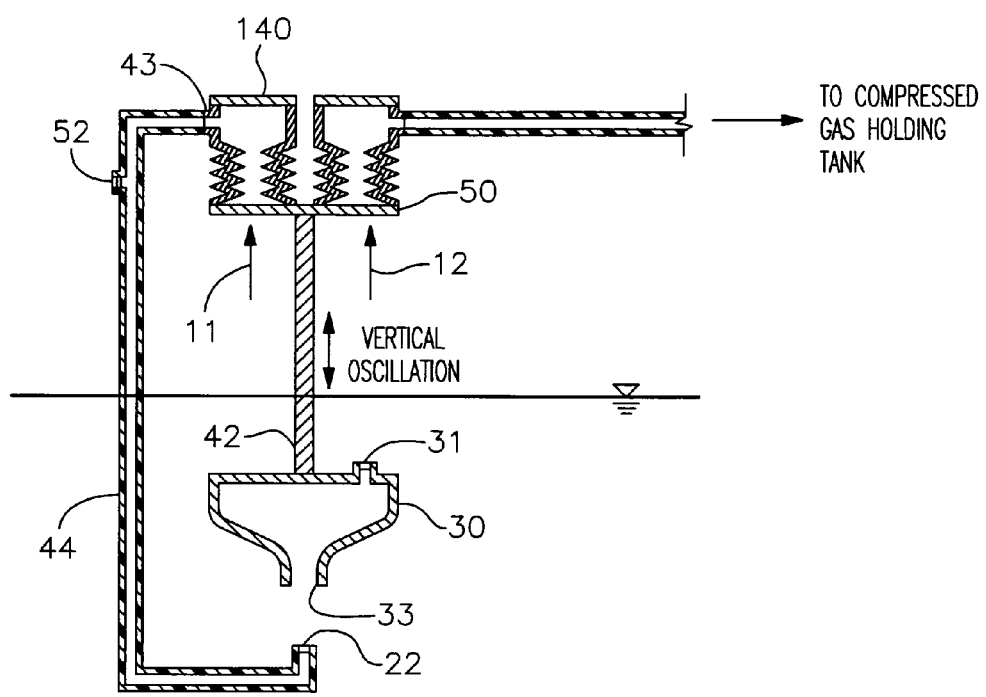
FIG. 3 is a cross section of one embodiment of the apparatus, showing the bellows embodiment of the gas compression means where the force recovery means comprises a bellows delivering compressed gas to a holding tank.

The apparatus can embody many other configurations. In FIG. 2, for example, the apparatus can further comprise a water tank 10 to contain the water needed for the moving vessel's 30 operation. Multiple bellows 140 could be located adjacent to the water tank 10, which is a matter of design choice. As another example, shown in FIG. 3, the second component 12 of the buoyancy force could be used to drive a bellows 140 that delivers compressed gas to a holding tank for use in other applications, such as for operating air-driven power tools. The number, placement, orientation, and size of the gas compression means 40 will be determined by such design choices, as will the selection and orientation of the force transfer means 42, force recovery means 50, and the conduit 44.

Figure 4:
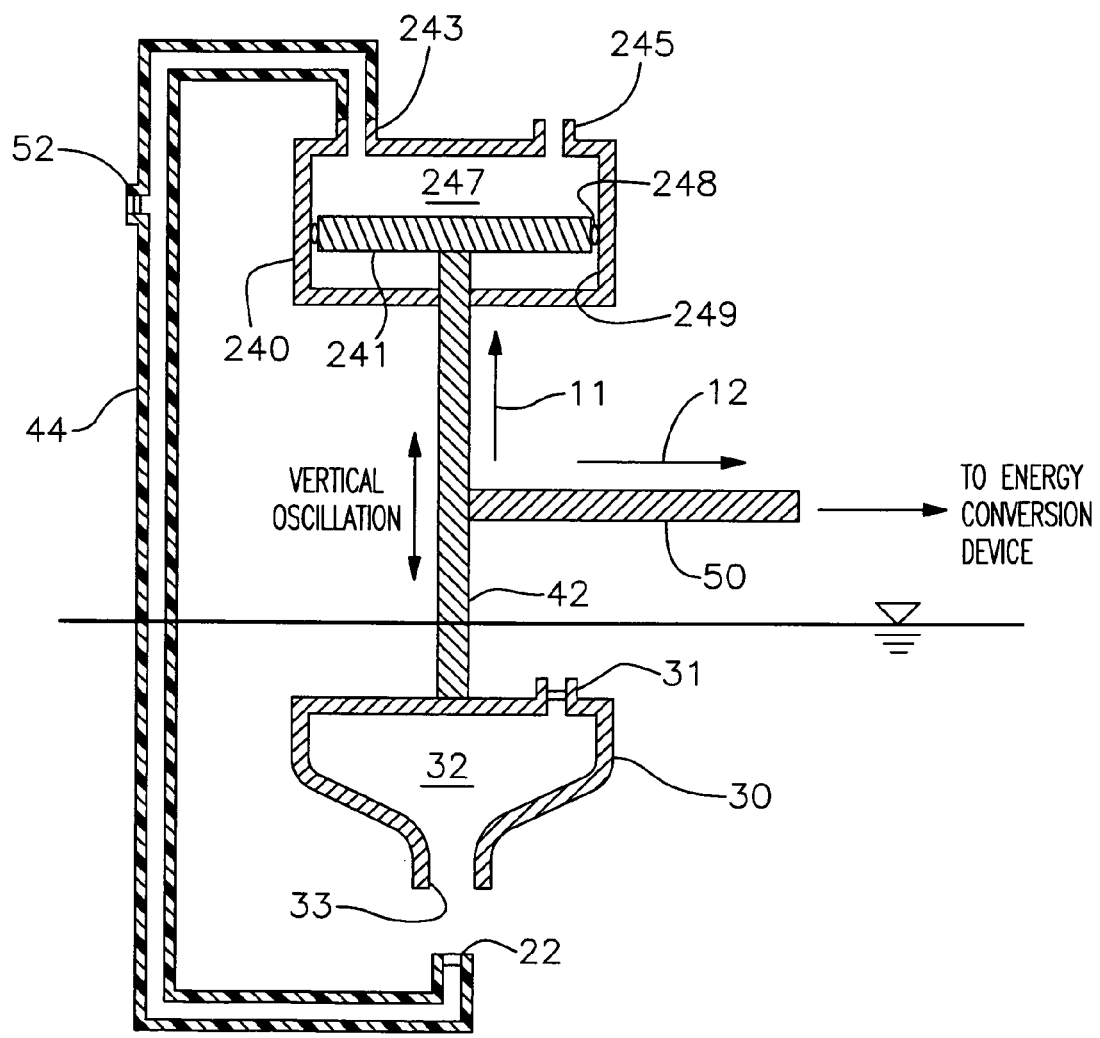
FIG. 4 is a cross section of one embodiment of the apparatus, showing a piston embodiment of the gas compression means, with the entry valves and exit valves near the top of the piston cylinder.

In the piston-type embodiment of the gas compression means 40, shown in FIG. 4, the tank comprises a piston cylinder 240 having inside walls 249, a compression chamber 247 and a piston head 241, which is attached to the moving vessel 30 by the force transfer means 42. The piston head 241 is made of a material having a relatively high strength to weight ratio, such as a high strength thermoplastic, carbon fiber material, or a lightweight metal. Ultra high molecular weight polyethylene, also known as high performance polyethylene, is one such material. The piston head 241 incorporates a piston ring 248, such as an O-ring, thereby creating a tight-fitting seal between the piston head 241 and the inside wall 249 of the piston cylinder 240. A lubricant is applied to the inside walls 249, thus reducing losses due to friction between the piston head 241 and the inside walls 249. The lubricant can be any suitable lubricant, as an ordinary practitioner will understand. For example, the lubricant could be a Teflon®-based, waterproof lubricant.

In this embodiment, the piston cylinder 240 further comprises an exit valve 243 and an entry valve 245, both of which are one-way valves. The exit valve 243 and entry valve 245 are arranged with an opposite-facing orientation so as to permit gas flow in opposite directions. That is, as the piston head 241 moves from the top of the piston cylinder 240 down towards the bottom of the cylinder, the piston head 241 draws gas into the chamber 247 via the entry valve 245. Then, when the piston head 241 moves from the bottom of the piston cylinder 240 towards the top of the tank, the gas inside the chamber 247 compresses. The compressed gas then leaves the chamber 247 via the exit valve 243 and enters the conduit 44 that carries the compressed gas from the piston cylinder 240 into the conduit 44 and to the charging valve 22. When the piston head 241 moves back toward the bottom of the piston cylindered 240, gas enters the chamber 247 via the entry valve 245, thereby repeating the gas compression cycle.

Figure 5:
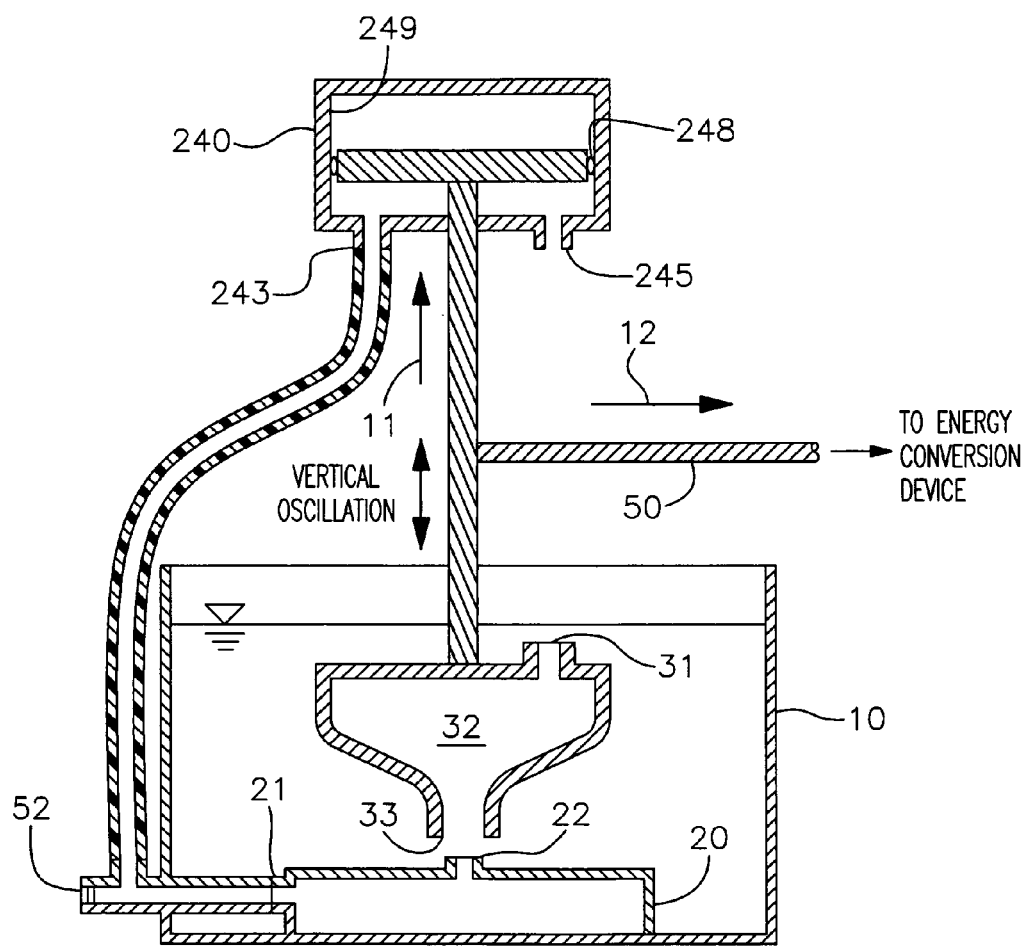
FIG. 5 is a cross section of one embodiment of the apparatus, showing a piston embodiment of the gas compression means, with the entry valves and exit valves near the top of the piston cylinder, and a charging vessel located near the bottom of the water tank.

In another embodiment, as shown in FIG. 5, the exit valve 243 and entry valve 245 are oriented such that the gas in the piston cylinder 240 is compressed during the piston's 241 down stroke, and gas is drawn into the chamber 247 during the piston's 241 upstroke. This embodiment has the advantage that it is self-priming, and no external gas compressor or energy source is needed to prime the apparatus or begin the energy production cycle. The cycle begins with the piston head 241 retained at the top of the upstroke. When the moving vessel 30 is released beginning the down stroke, the piston head 241 charges the conduit 44 as described above. Before the moving vessel 30 engages the charging valve 22, the conduit 44 is primed with enough compressed gas to drive the upstroke of the moving vessel 30, as described above.

As shown in FIG. 5, each embodiment of the apparatus can further comprise a charging vessel 20, which is a holding tank for compressed gas located between the conduit 44 and the charging valve 22. In embodiments where the charging vessel 20 is used, an additional one way injection valve 21 is located between the conduit 44 and the charging vessel 20. The purpose of the charging vessel 20 is to retain a volume of compressed gas sufficient to charge the moving vessel 30 to create the required buoyancy force.

Figure 6:
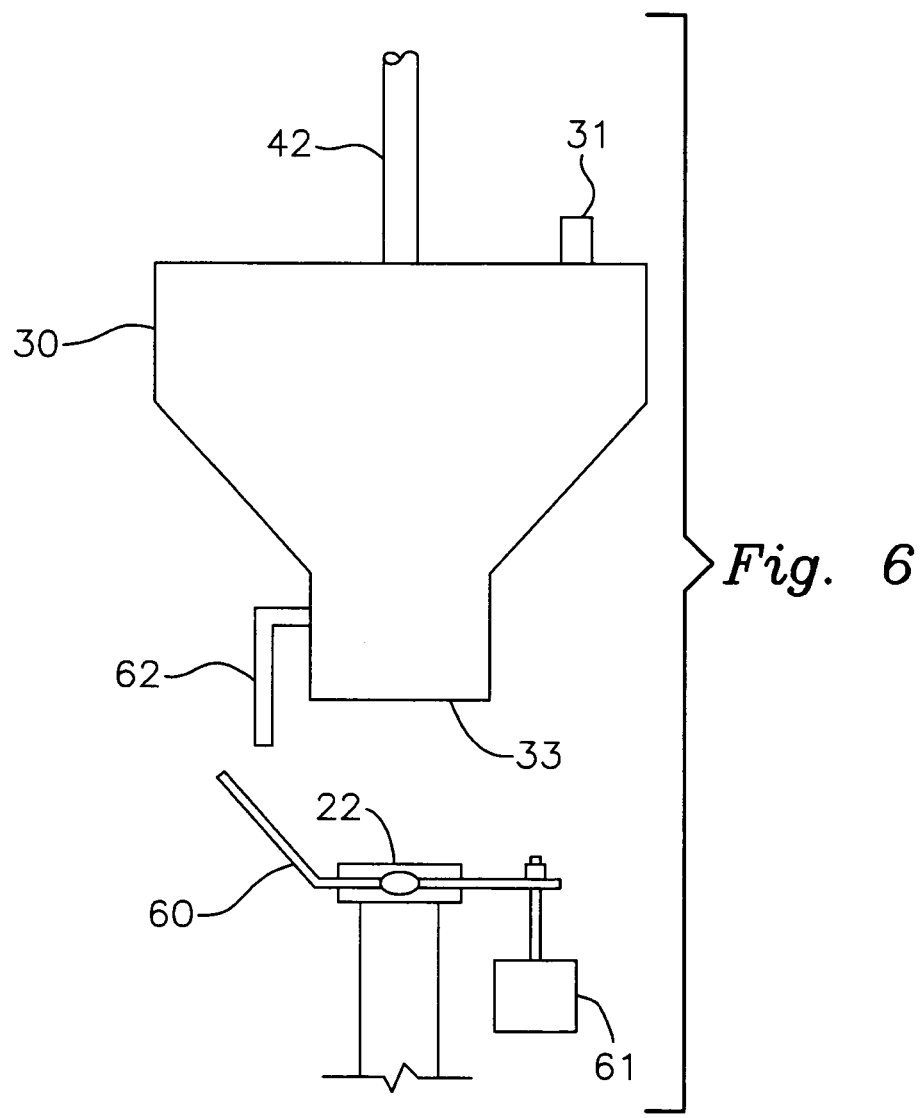
FIG. 6 shows an elevation view of one embodiment of a valve control means to control the charging valve.

The apparatus has a valve control system, of which there are several possible embodiments. For example, in one embodiment the valve control system is a purely mechanical system relying on mechanical means to open and close the various valves. FIG. 6 shows an example of how a mechanical charging valve 22 can operate. The charging valve 22 can be a typical plumbing valve having an actuator 60, and a weight 61 can be used to retain the actuator 60 in its closed position. In this embodiment, the moving vessel 30 is fitted with an engagement mechanism 62, which is a means for opening the charging valve 22 upon physical contact with the actuator 60. The engagement mechanism 62 could be a plate, rod, block, arm, or the like. When the moving vessel 30 is at the bottom of the down stroke, the engagement mechanism 62 engages the actuator 60, thereby opening the charging valve 22.

Figure 7:
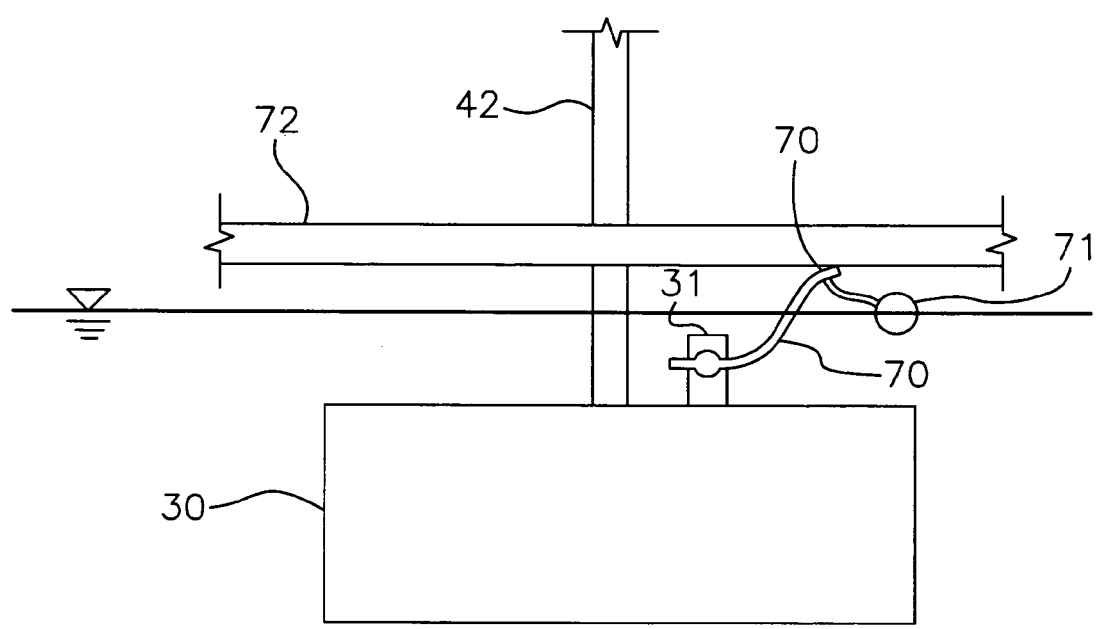
FIG. 7 shows an elevation of one embodiment of a valve control means that operates the gas release means.

In another embodiment, shown in FIG. 7, there is at least one gas control means 31, with each gas control means 31 being a common plumbing valve, again operated by an actuator 70. A float 71 is attached to the actuator 70, and a crossbar 72 is fixed above the top of the moving vessel's 30 upstroke. The crossbar 72 is placed at a location where it will engage the actuator 70 when the moving vessel 30 is at the top of its upstroke. When the moving vessel 30 sinks into the water, the float 71 rises in the water, thereby closing the gas control means 31. Then, when the moving vessel 30 approaches the top of its upstroke, the actuator 70 engages the crossbar 72, thereby opening the gas control means 31 and releasing the gas in the cavity 32 of the moving vessel 30.

In another embodiment, the valve control system comprises computer software that controls the electronic operation of selected valves. For example, the period of the moving vessel's 30 vertical oscillation cycle can be determined based on the length of the stroke and the balance of buoyancy and gravitational forces. Once this period is determined, a computer could be programmed to open or close the charging valve 22 and the gas control means 31 at predetermined time intervals corresponding to the period of the moving vessel 30.

In another embodiment, the valve control system comprises both mechanical and electronic aspects to operate certain valves. For example, in one embodiment of the valve control system, the charging valve 22 and the gas control means 31 could be fitted with pressure transducers such that the corresponding valves are controlled by the computer based on hydrostatic pressure changes indicated by the transducers. For example, when the hydrostatic pressure approaches a predetermined minimum, the gas control means 31 is opened, thus releasing gas from the cavity 32. As the hydrostatic pressure increases while the moving vessel 30 sinks, the gas control means 31 is closed, thus sealing the cavity 32. When the hydrostatic pressure approaches a predetermined maximum corresponding to the bottom of the down stroke, the charging valve 22 is opened, thus discharging compressed gas into the cavity 32.

The embodiments disclosed above are merely representative of the apparatus and process and not meant for limitation of the invention. One having ordinary skill in the art would understand that the individual features of several disclosed embodiments are interchangeable with the features of other embodiments. For example, the apparatus could comprise multiple gas compression means 40 used in series or in combination, as desired. Also, multiple apparatuses could be used in combination to drive one or more energy conversion devices capable of harnessing the collective power and energy output from the multiple devices. Consequently, it is understood that equivalents and substitutions for certain elements and components set forth above are part of the invention, and therefore the true scope and definition of the invention is to be as set forth in the following claims.

I claim:

1. An apparatus for capturing energy from gravitational and buoyancy forces, said apparatus comprising:
    a moving vessel capable of sinking through water under a gravitational force, and capable of receiving gas such that the gas creates a buoyancy force in the moving vessel, causing the moving vessel to rise through the water, where said buoyancy force has a first component and a second component;
    a force transfer means attached to the moving vessel, said force transfer means capable of transferring the first component of the buoyancy force generated by the moving vessel;
    a gas compression means disposed externally to the moving vessel, said gas compression means connected to the force transfer means and capable of receiving said first component from the force transfer means and using said first component to compress gas;
    a conduit capable of receiving compressed gas from the gas compression means and retaining said compressed gas for discharge into the moving vessel; and
    a force recovery means capable of recovering the second component of the buoyancy force and transferring said second component to an energy conversion means;
    wherein the conduit comprises a priming valve for introducing a priming charge of compressed gas into the conduit during periodic maintenance of the apparatus.

2. The apparatus of claim 1 wherein the gas compression means comprises one or more bellows.

3. The apparatus of claim 2, further comprising a valve control means.

4. The apparatus of claim 3, further comprising a charging vessel.

5. The apparatus of claim 4 wherein the valve control means comprises one or more computer-controlled valves.

6. The apparatus of claim 1 wherein the gas compression means comprises one or more pistons.

7. The apparatus of claim 6, further comprising a valve control means.

8. The apparatus of claim 7, further comprising a charging vessel.

9. The apparatus of claim 8 wherein the valve control means comprises one or more computer-controlled valves.

10. A method of using gravitational forces and buoyancy forces to create useable energy, said method comprising the steps of:
   (a) introducing compressed gas into a conduit comprising a priming valve;
   (b) releasing the compressed gas from the conduit into a moving vessel, thus creating a buoyancy force in the moving vessel, said buoyancy force having a first component and a second component;
   (c) using the first component of the buoyancy force to compress gas by a gas compression means;
   (d) channeling the compressed gas from the gas compression means into the conduit where the compressed gas is retained until it is released into the moving vessel;
   (e) using a force recovery means to recover the second component of the buoyancy force and transfer said second component to an energy conversion means; and
   (f) providing periodic maintenance to the apparatus during which compressed gas is introduced to the conduit through the priming valve.

11. The method of claim 10, wherein steps (b) and (d) further comprise the step of releasing the compressed gas from the conduit into a charging vessel and the step of releasing the compressed gas from the charging vessel into the moving vessel.

12. An apparatus for capturing energy from gravitational and buoyancy forces, said apparatus comprising:
   a moving vessel capable of sinking through water under a gravitational force, and capable of receiving gas such that the gas creates a buoyancy force in the moving vessel, causing the moving vessel to rise through the water, where said buoyancy force has a first component and a second component;
   a force transfer means attached to the moving vessel, said force transfer means capable of transferring the first component of the buoyancy force generated by the moving vessel;
   a gas compression means disposed externally to the moving vessel, said gas compression means connected to the force transfer means and capable of receiving said first component from the force transfer means and using said first component to compress gas;
   a conduit capable of receiving compressed gas from the gas compression means and retaining said compressed gas for discharge into the moving vessel; and
   a force recovery means capable of recovering the second component of the buoyancy force and transferring said second component to an energy conversion means,
   wherein the conduit releases gas into the moving vessel, thereby creating a buoyancy force and the buoyancy force is bifurcated into a first component that is transferred through the force transfer means to the compression means where said first component is used to compress gas, and a second component that is used to drive an energy recovery means; and
   further wherein the conduit comprises a priming valve for introducing a priming charge of compressed gas into the conduit during periodic maintenance of the apparatus.

13. The apparatus of claim 12 wherein the gas compression means comprises one or more bellows.

14. The apparatus of claim 13, further comprising a valve control means.

15. The apparatus of claim 14, further comprising a charging vessel.

16. The apparatus of claim 15 wherein the valve control means comprises one or more computer-controlled valves.

17. The apparatus of claim 12 wherein the gas compression means comprises one or more pistons.

18. The apparatus of claim 17, further comprising a valve control means.

19. The apparatus of claim 18, further comprising a charging vessel.

20. The apparatus of claim 19 wherein the valve control means comprises one or more computer-controlled valves.

* * * * *